(12) United States Patent
Schreiber

(10) Patent No.: US 7,904,476 B1
(45) Date of Patent: Mar. 8, 2011

(54) COMPUTER-IMPLEMENTED METHOD FOR COMPRESSING REPRESENTATION OF BINARY RELATION

(75) Inventor: Robert Samuel Schreiber, Palo Alto, CA (US)

(73) Assignee: Hewlett-Packard Develpment Company, L.P., Houston, TX (US)

( * ) Notice: Subject to any disclaimer, the term of this patent is extended or adjusted under 35 U.S.C. 154(b) by 419 days.

(21) Appl. No.: 11/888,001

(22) Filed: Jul. 30, 2007

(51) Int. Cl.
G06F 7/00 (2006.01)

(52) U.S. Cl. ............................................ 707/785; 726/6
(58) Field of Classification Search .............. 707/9, 781, 707/785; 726/4, 6
See application file for complete search history.

(56) References Cited

U.S. PATENT DOCUMENTS

| | | | |
|---|---|---|---|
| 5,173,939 A | 12/1992 | Abadi et al. | |
| 5,911,143 A | 6/1999 | Deinhart et al. | |
| 6,023,765 A | 2/2000 | Kuhn | |
| 6,055,637 A | 4/2000 | Hudson et al. | |
| 6,088,679 A | 7/2000 | Barkley | |
| 6,768,988 B2 | 7/2004 | Boreham et al. | |
| 6,785,686 B2 | 8/2004 | Boreham et al. | |
| 6,947,989 B2 | 9/2005 | Gullotta et al. | |
| 6,985,955 B2 | 1/2006 | Gullotta et al. | |
| 7,016,907 B2 | 3/2006 | Boreham et al. | |
| 7,130,839 B2 | 10/2006 | Boreham et al. | |
| 7,131,000 B2 | 10/2006 | Bradee | |
| 2003/0172161 A1 | 9/2003 | Rymon | |
| 2007/0156693 A1* | 7/2007 | Soin et al. | 707/9 |
| 2007/0214497 A1* | 9/2007 | Montgomery et al. | 726/4 |
| 2008/0022370 A1* | 1/2008 | Beedubail et al. | 726/4 |
| 2008/0120314 A1* | 5/2008 | Yang et al. | 707/101 |

OTHER PUBLICATIONS

Iver Band, et al. "Role Discovery in Role-Based Access Control", 3 sheets, [not published] HP IT Global Telecommunications, HP Labs.

* cited by examiner

*Primary Examiner* — Hung T Vy

(57) ABSTRACT

One embodiment relates to an automated method for compressing an n-partite representation of an access control list or other binary relation. A first joining procedure is applied to join first and second relations in the n-partite representation and so eliminate a first intermediate set of elements, resulting in a first (n−1)-partite representation. A first re-factoring procedure generates updated first and second relations and an updated first intermediate set of elements, resulting in an updated n-partite representation. Other features, aspects and embodiments are also disclosed.

17 Claims, 16 Drawing Sheets

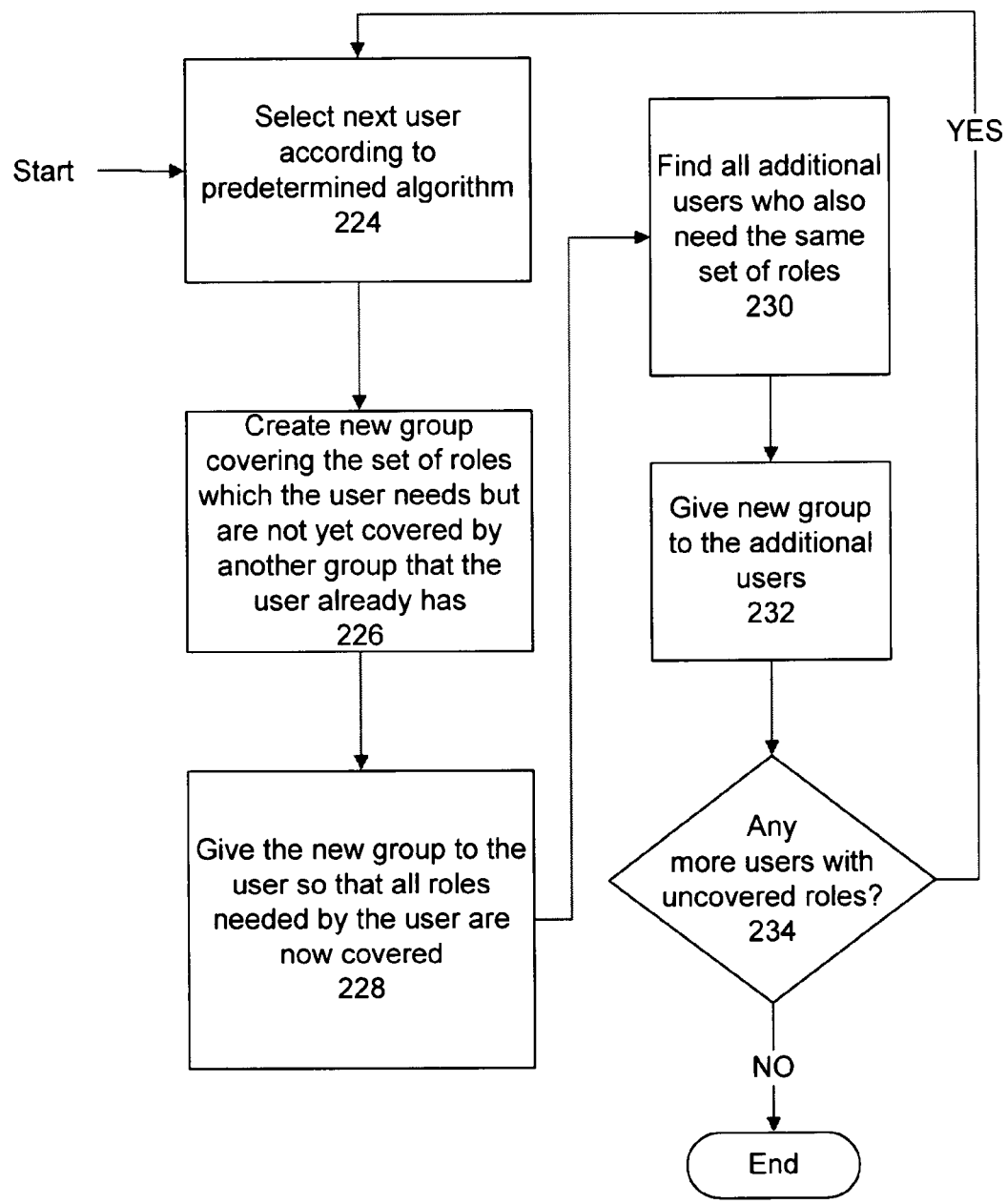
FIG. 2B    220

COMPUTER-IMPLEMENTED METHOD FOR COMPRESSING REPRESENTATION OF BINARY RELATION

BACKGROUND

1. Field of the Invention

The present application relates generally to access control lists and other databases.

2. Description of the Background Art

A relation may be defined as a set of n-tuple elements. More particularly, a binary relation may be defined as a set of pairs (2-tuple) elements. Many databases, including access control lists (ACLs), are binary relations or contain binary relations.

In a simple access control system, an ACL keeps track of the user accounts (users) that have permission to use a given resource. The resource may be a file, or a network machine (with an internet protocol address), or a service provided by a port on a network machine, for example.

Such an ACL may have a very large number of entries. As a simple example, if one thousand users each had permission to use one thousand different resources, then the ACL would have a total of one million (one thousand multiplied by one thousand) entries. As the number of users and the number of resources grow, the size of this representation becomes extremely large and unwieldy.

Management of access control lists and other databases becomes more difficult with their increasing size. Moreover, redundant representation of information causes difficulty in the maintenance of such databases.

BRIEF DESCRIPTION OF THE DRAWINGS

FIG. 2B shows a factoring procedure applied to generate groups between users and roles.

DETAILED DESCRIPTION

In order to alleviate the above-discussed difficulties with large and unwieldy representations of binary relations, it is highly desirable to find an effective technique to create a reduced-size representation, perhaps close to optimally small, of a binary relation. Previous approaches to this problem involved factoring the relation into a product of two simpler relations. This introduces a new layer of entities. In the context of access control systems, the entities in the new layer are typically called "roles".

However, applicant believes that these previous approaches are sub-optimal and may be substantially improved by the approach disclosed herein. In particular, the present application discloses a technique which introduces two new layers of entities which enables superior compression of a binary relation.

Figure 1:
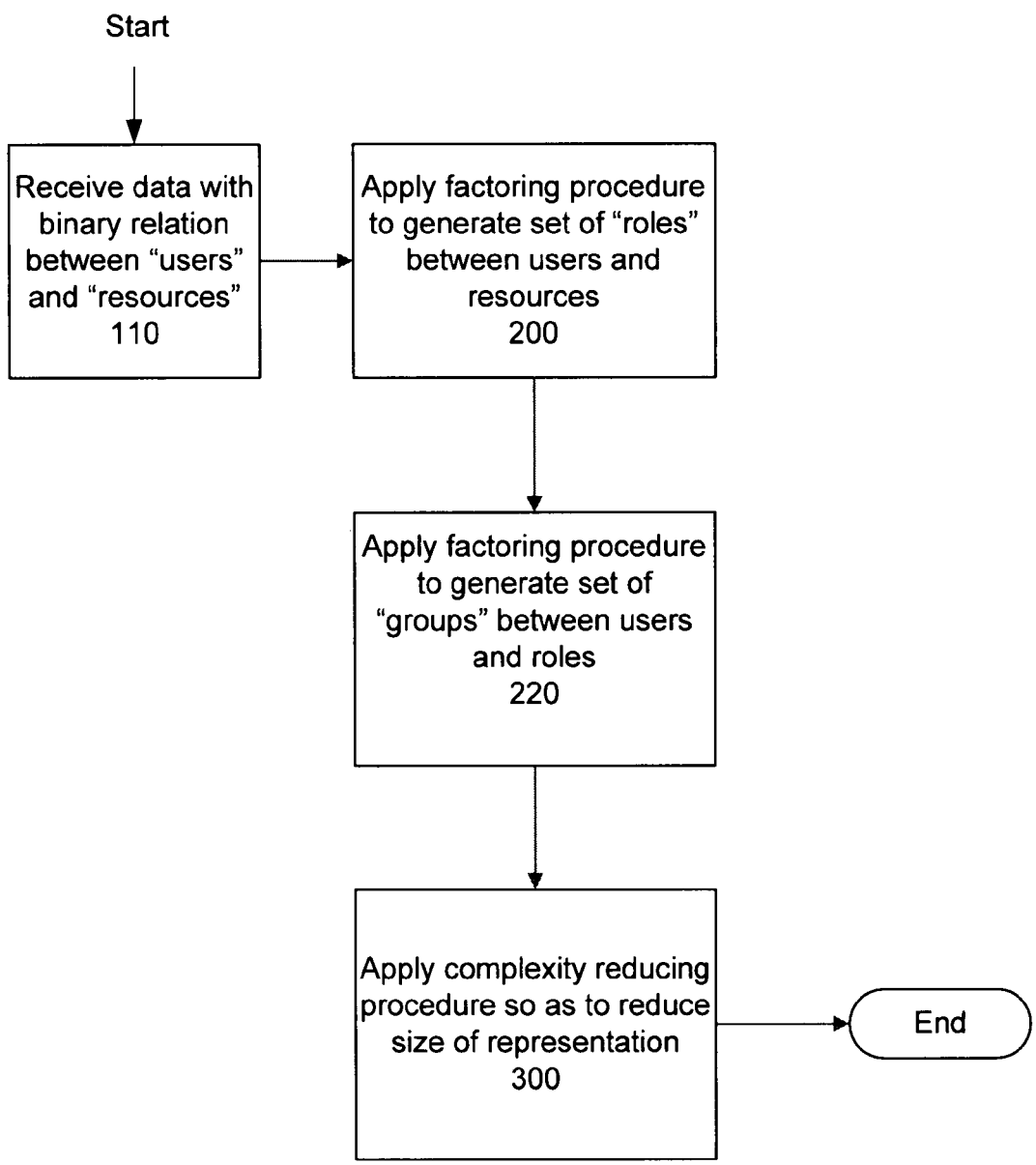
FIG. 1 is a flow chart depicting a method for compressing representation of a binary relation in accordance with an embodiment of the invention.

FIG. 1 is a flow chart depicting a method 100 for compressing representation of a binary relation in accordance with an embodiment of the invention. This method 100 utilizes the introduction of two intermediate sets (called groups and roles in the context of access control), connects the users to the groups, the groups to the roles, and the roles to the resources.

Advantageously, significant reduction in size of the representation may be achieved using this method 100. To reduce the size of the representation, the method 100 finds and utilizes redundancies.

In accordance with an embodiment of the invention, the representation found is quadrapartite in that it generates three new, small binary relations in which two new sets of elements, groups and roles, are introduced. In the first introduced relation, users are assigned to one or more groups. In the second introduced relation, groups are connected to one or more roles. In the third introduced relation, roles are connected to one or more resources. The original relation between users and resources may then be recovered as follows.

If a user is a member of a group that is connected to a role that carries with it permission to use a resource, then and only then does the user have permission to use the resource.

More particularly, the blocks in the flow chart of FIG. 1 are described as follows. In block 110, data is received with the binary relation. For example, in the context of access control, the binary relation may be between "users" and "resources" where each user may have permission to access one or more resource.

Figure 5A:
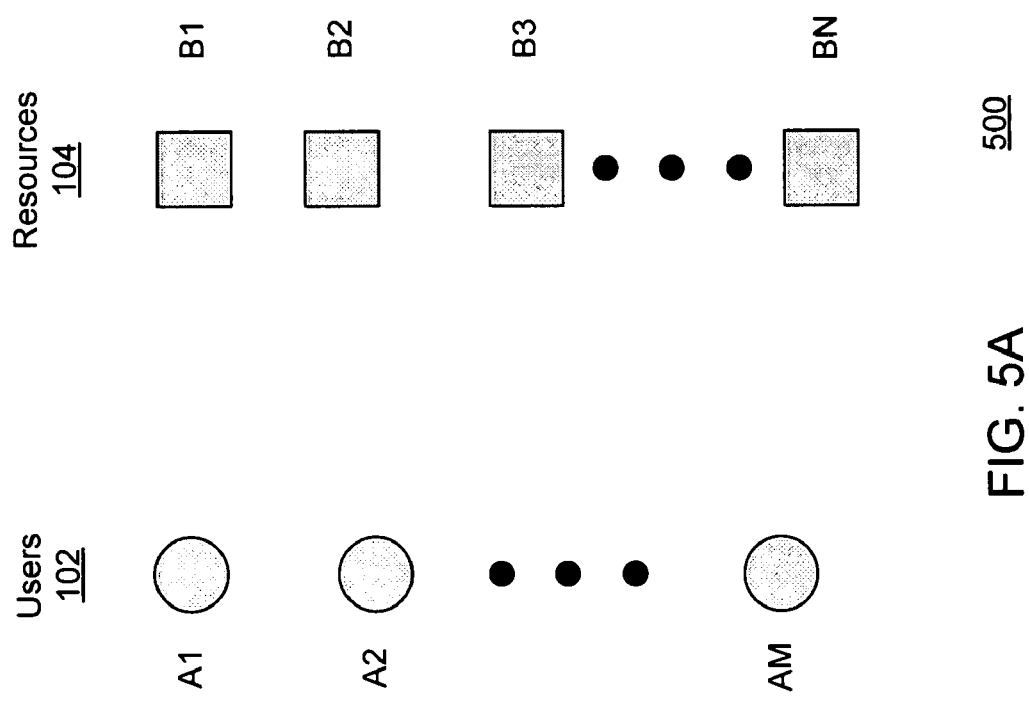
FIG. 5A is a schematic diagram depicting elements for an example binary relation involving users and resources in accordance with an embodiment of the invention.

The binary relation 500 in the data received is illustrated in FIG. 5A with users 102 connected to resources 104. Note that FIG. 5A does not show the connections between layers for purposes of simple illustration.

Next, a first factoring procedure 200 is applied to generate a set of "roles" between the users and the resources. This introduces two relations, where users are connected to one or more roles, and roles are connected to one or more resources. In accordance with an embodiment of the invention, the first factoring procedure 200 may be accomplished by the procedure shown in FIG. 2A which is described in detail below.

Figure 5B:
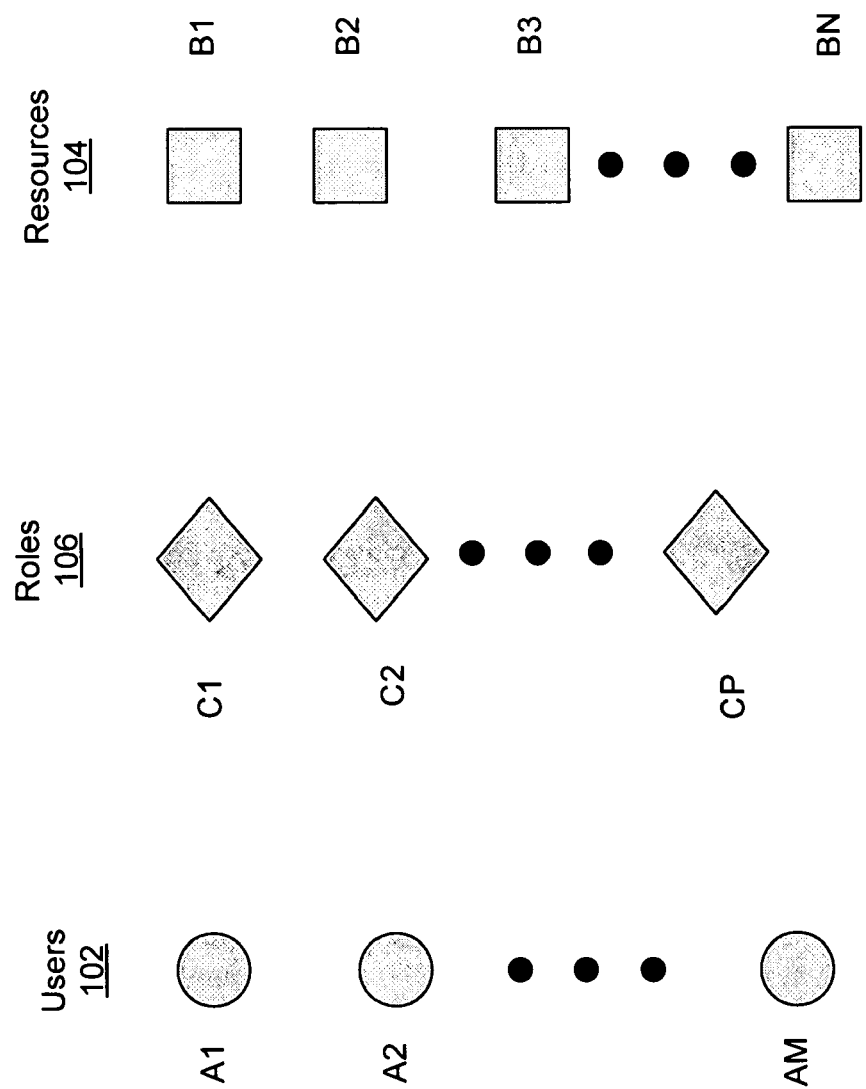
FIG. 5B is a schematic diagram depicting elements for an example tripartite representation of a binary relation involving an intermediate layer of roles in between users and resources in accordance with an embodiment of the invention.

As a result of the first factoring procedure 200, a tripartite representation 510 has been formed, as illustrated in FIG. 5B, with users 102 connected to roles 106, and roles 106 connected to resources 104. Note that FIG. 5B does not show the connections between layers for purposes of simple illustration.

Subsequently, a second factoring procedure 220 is applied to generate a set of "groups" between the users and the roles. This introduces two relations, where users are connected to one or more groups, and groups are connected to one or more roles. These two relations supersede or replace the previously introduced relation where users are connected to one or more roles. In accordance with an embodiment of the invention, the second factoring procedure 220 may be accomplished by the procedure shown in FIG. 2B which is described in detail below.

Figure 5C:
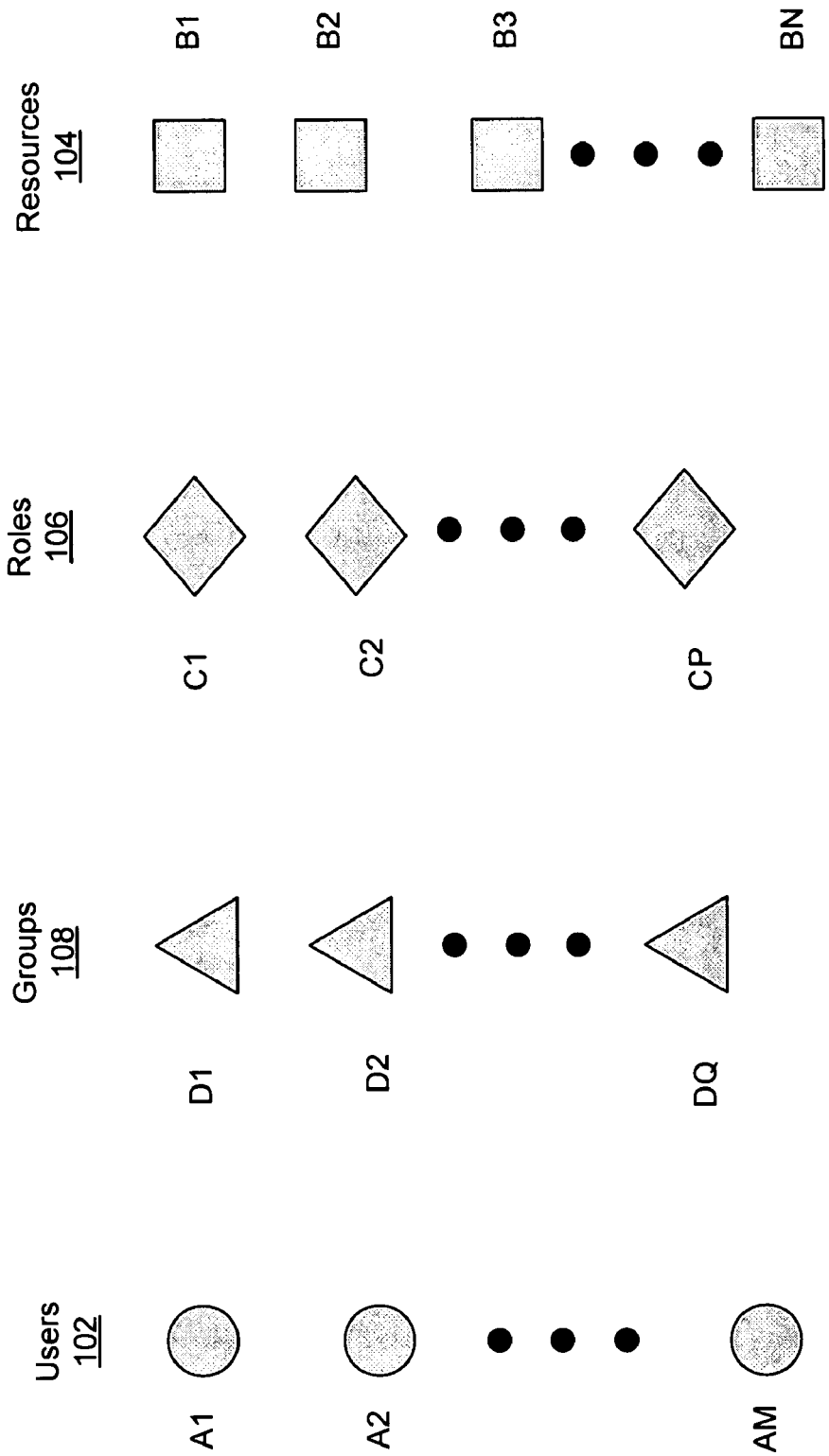
FIG. 5C is a schematic diagram depicting elements for an example quadrapartite representation of a binary relation involving two intermediate layers of groups and roles in between users and resources in accordance with an embodiment of the invention.

As a result of the second factoring procedure 220, a quadrapartite representation 520 has been formed, as illustrated in FIG. 5C, with users 102 connected to groups 108, groups 108 connected to roles 106, and roles 106 connected to resources 104. Note that FIG. 5C does not show the connections between layers for purposes of simple illustration.

Finally, a complexity reducing procedure 300 is applied to reduce the size of the quadrapartite representation. In accordance with an embodiment of the invention, the complexity reducing procedure 300 may be accomplished by the procedure shown in FIG. 3 which is described in detail below.

Figure 2A:
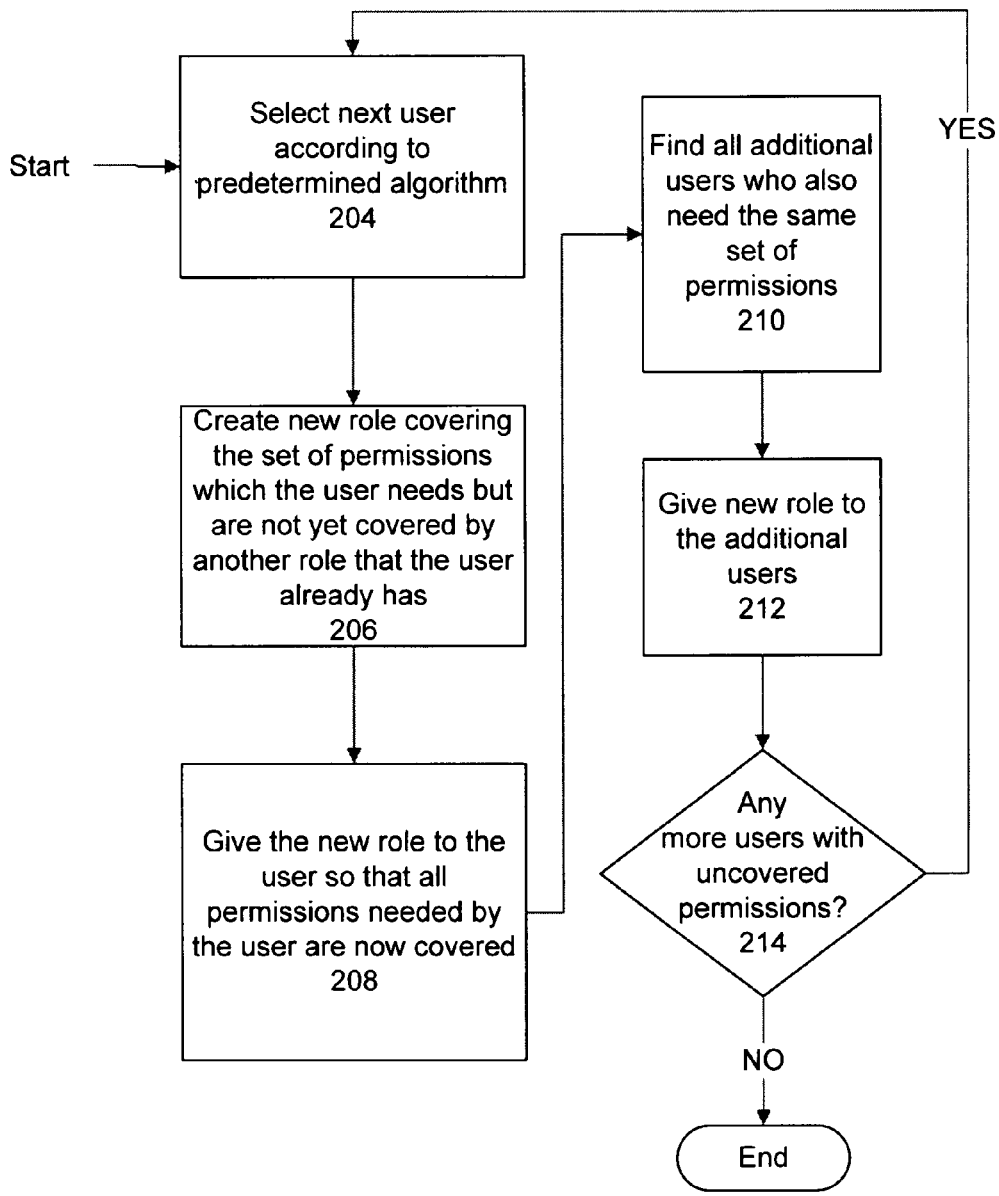
FIG. 2A shows a factoring procedure applied to generate roles between users and resources.
Figure 2C:
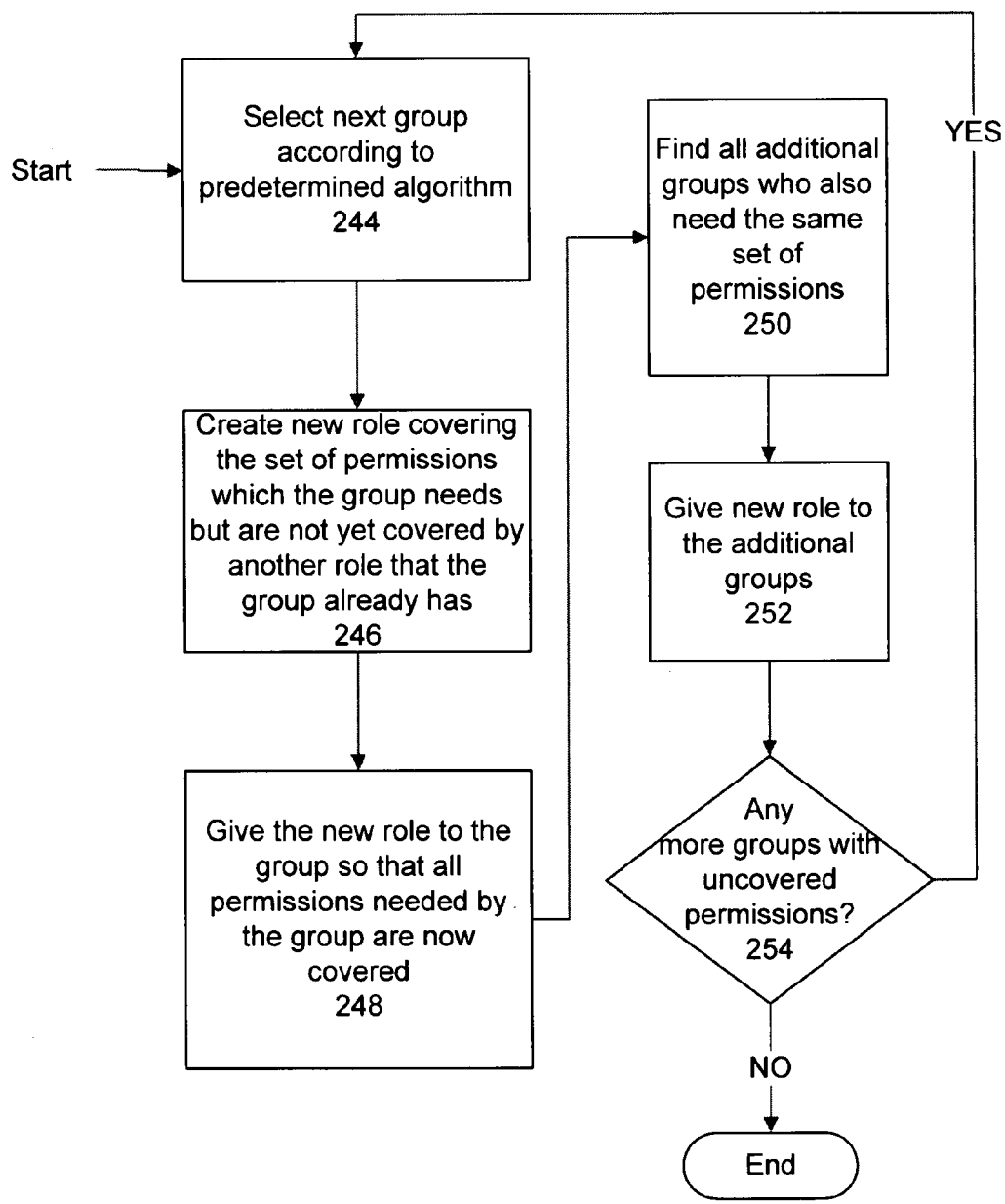
FIG. 2C shows a factoring procedure applied to generate roles between groups and resources.

FIGS. 2A, 2B, and 2C are flow charts, each depicting a factoring procedure to form a tripartite representation of a binary relation in accordance with an embodiment of the invention. FIG. 2A shows the factoring procedure applied to generate roles between users and resources. FIG. 2B shows the factoring procedure applied to generate groups between users and roles. FIG. 2C shows the factoring procedure applied to generate roles between groups and resources.

Referring to FIG. 2A, a flow chart is shown of a computer-implemented procedure 200 for role discovery in access control systems where a predetermined algorithm is used to select a next user in accordance with an embodiment of the invention.

In block 204, a next user is selected according to a predetermined algorithm. Various predetermined algorithms may be applied to select the next user. In a first embodiment, the predetermined algorithm may be to select the user with fewest uncovered permissions remaining (not counting those users whose permissions are already all covered by roles). In the example shown in FIG. 4A, users A1, A2 and A4 each have two permissions, while user A3 has three permissions. Assuming all these permissions are uncovered, then this specific algorithm may select user A1 (or user A2 or A4) as its two uncovered permissions is among the fewest. In a second embodiment, the predetermined algorithm may be to select the user with the most uncovered permissions remaining (not counting those users whose permissions are already all covered by roles). In the example shown in FIG. 4A, users A1, A2 and A4 each have two permissions, while user A3 has three permissions. Assuming all these permissions are uncovered, then this specific algorithm may select user A3 as its three uncovered permissions is the most. In a third embodiment, the predetermined algorithm may randomly select a next user from the remaining users with at least one uncovered permission (not counting those users whose permissions are already all covered by roles). In the example shown in FIG. 4A, assuming users A1-A4 each have at least one uncovered permission, then this specific algorithm may randomly select from amongst these four users. On the other hand, if user A1 had all of its permissions already covered by a role or roles, then this specific algorithm would randomly select from amongst the group of users including users A2, A3 and A4, but not A1.

In block 206, a new role is created where the new role covers the set of permissions to which the selected user still needs in that they are not yet covered by any other role that the user has. For example, consider FIG. 4A, assuming the case where none of the permissions shown have been covered so far, and further that the selected user (per block 204) is user A1. As emphasized in FIG. 4B, user A1 has permission to access resources B1 and B3. Hence, in this example, a new role would be created to cover permissions to access resources B1 and B3. Such a new role, labeled C1 is shown in FIG. 4C. As seen, role C1 provides permission to access resources B1 and B3.

Per block 208, the new role is given to the selected user. Since the new role covers all the previously uncovered permissions of the selected user, the selected user now has all its permissions covered by roles. For example, FIG. 4C shows by the line between user A1 and role C1 that user A1 is given role C1. Further, it is shown that all the permissions of user A1 are now covered by roles (in this case, by role C1).

In block 210, all additional users who also need access to the same set of permissions are found. In other words, all users who also have the same uncovered permissions are found. In our example, as emphasized in FIG. 4D, user A4 also has uncovered permissions to resources B1 and B3. Hence, user A4 is an additional user who also needs access to the same set of permissions.

Per block 212, the new role is also given to the additional users (found per block 210). For example, FIG. 4E shows by the line between user A4 and role C1 that user A4 is also given role C1.

Per block 214, a determination may then be made as to whether there are any more users with uncovered permissions.

If there are one or more users with uncovered permissions remaining, then the procedure 200 loops back to block 204 and selects the next user according to the predetermined algorithm. For example, FIG. 4F shows diagrammatically the addition of the new role C2 to cover the permissions of the user A2, and the addition of the new role C3 to cover the permissions of the user A3.

On the other hand, if there are no more users with uncovered permissions remaining, then the procedure 200 may end as all the permissions have been covered by roles.

Referring to FIG. 2B, a procedure 220 is shown which is similar to the procedure 200 discussed above in relation to FIG. 2A. The difference is that FIG. 2B shows the application of the procedure to generate an intermediate layer of groups between users and roles.

In block 224, a next user is selected according to a predetermined algorithm. As discussed above, various predetermined algorithms may be applied to select the next user.

In block 226, a new group is created where the new group covers the set of roles which the selected user still needs in that they are not yet covered by any other group that the user has. Per block 228, the new group is given to the selected user. Since the new group covers all the previously uncovered roles of the selected user, the selected user now has all its roles covered by groups.

In block 230, all additional users who also need access to the same set of roles are found. In other words, all users who also have the same uncovered roles are found. Per block 232, the new group is also given to the additional users (found per block 230).

Per block 234, a determination may then be made as to whether there are any more users with uncovered roles. If there are one or more users with uncovered roles remaining, then the procedure 220 loops back to block 224 and selects the next user according to the predetermined algorithm. On the other hand, if there are no more users with uncovered roles remaining, then the procedure 220 may end as all the roles have been covered by groups.

Referring to FIG. 2C, a procedure 240 is shown which is also similar to the procedure 200 discussed above in relation to FIG. 2A. The difference is that FIG. 2C shows the application of the procedure to generate an intermediate layer of roles between groups and resources.

In block 244, a next group is selected according to a predetermined algorithm. As discussed above, various predetermined algorithms may be applied to select the next group (analogous to the predetermined algorithms applied to select a next user).

In block 246, a new role is created where the new role covers the set of permission which the selected group still needs in that they are not yet covered by any other role that the group has. Per block 248, the new role is given to the selected group. Since the new role covers all the previously uncovered permissions of the selected group, the selected group now has all its permissions covered by roles.

In block 250, all additional groups who also need access to the same set of permissions are found. In other words, all groups who also have the same uncovered permissions are found. Per block 252, the new role is also given to the additional groups (found per block 250).

Per block 254, a determination may then be made as to whether there are any more groups with uncovered permissions. If there are one or more groups with uncovered permissions remaining, then the procedure 240 loops back to block 244 and selects the next group according to the predetermined algorithm. On the other hand, if there are no more groups with uncovered permissions remaining, then the procedure 240 may end as all the permissions have been covered by roles.

Figure 3:
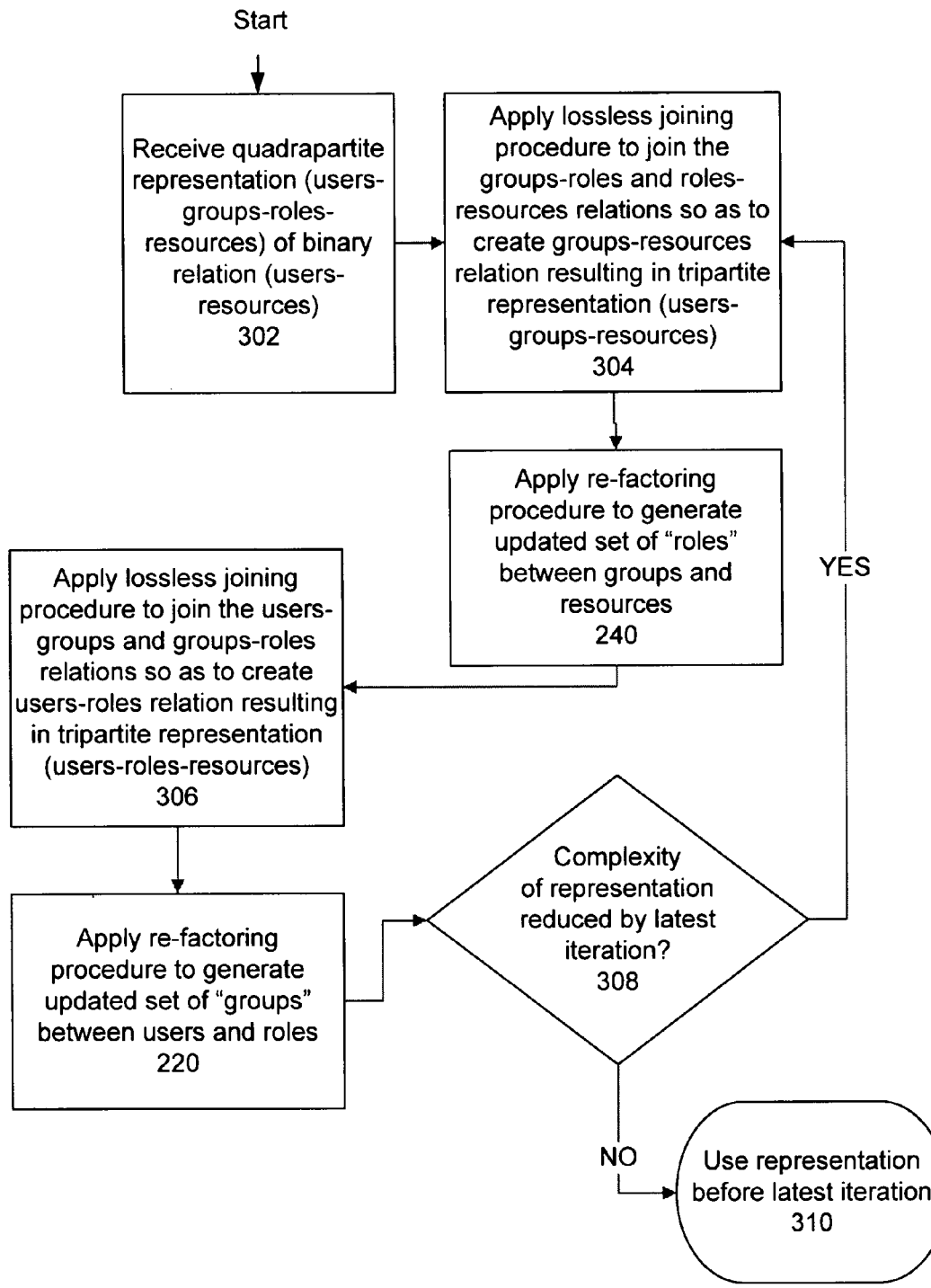
FIG. 3 is a flow chart depicting a procedure to reduce complexity of a quadrapartite representation of a binary relation in accordance with an embodiment of the invention.

FIG. 3 is a flow chart depicting a procedure 300 to reduce complexity of a quadrapartite representation of a binary relation in accordance with an embodiment of the invention. As described below, this procedure 300 may be utilized, for example, to simplify a quadrapartite representation comprising users connected to groups, groups connected to roles, and roles connected to resources.

Such a quadrapartite representation may be initially generated, for example, by the factoring procedures described above in relation to FIGS. 1, 2A and 2B. In block 302, the quadrapartite representation is received.

Figure 5D:
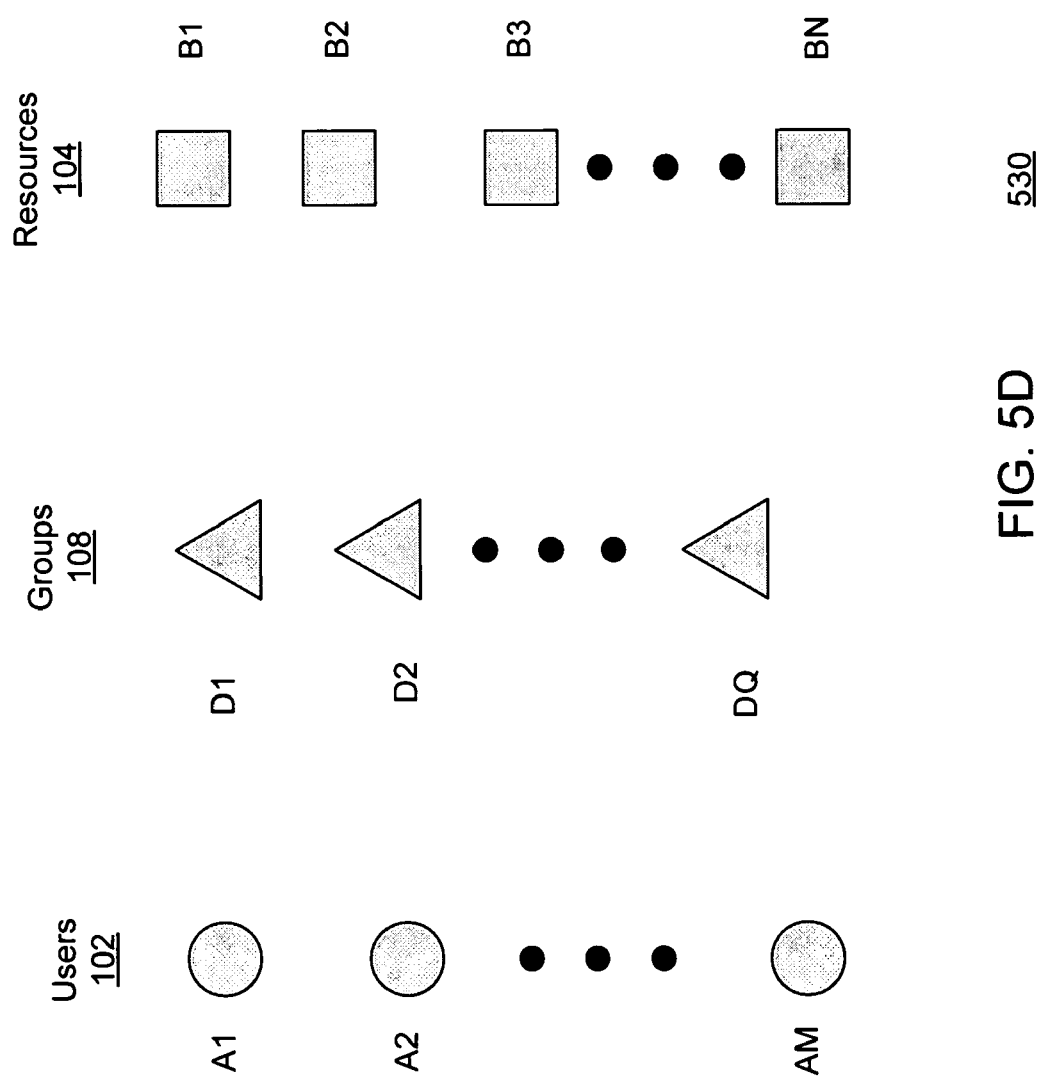
FIG. 5D is a schematic diagram depicting elements for an example tripartite representation of a binary relation involving an intermediate layer of groups in between users and resources in accordance with an embodiment of the invention.

Per block 304, a first lossless joining procedure is applied to join the groups-to-roles relation and the roles-to-resources relation so as to create a groups-to-resources relation. As a result of this first joining procedure, the quadrapartite representation is temporarily transformed to a tripartite representation with users connected to groups, and groups connected to resources. Consider the quadrapartite relation illustrated in FIG. 5C. The lossless joining procedure of block 304 may be implemented, for example, by going through the groups 108 one at a time. For each group 108, the roles 106 connected to the group may be examined to determine all the resources 104 to which the group 108 has permission to access. The binary relation between groups 108 and resources 104 may thus be formed. The result is formation of a tripartite representation 530, as illustrated in FIG. 5D. Note that FIG. 5D does not show the connections between layers for purposes of simple illustration.

Subsequently, in block 240, a first re-factoring procedure is applied to generate an updated set of "roles" between groups and resources. This re-introduces two relations, where groups are connected to one or more roles, and roles are connected to one or more resources. These two relations supersede or replace the previously introduced relation where groups are connected to one or more resources. In accordance with an embodiment of the invention, the first re-factoring procedure 240 may be accomplished by the procedure shown in FIG. 2C which is described in detail above. The result is the re-formation of a quadrapartite representation 520, as illustrated in FIG. 5C. This re-formed quadrapartite representation typically differs from the previously-formed quadrapartite representation in that the role set has been re-generated and so should typically be more compact.

Thereafter, per block 306, a second lossless joining procedure is applied to join the users-to-groups relation and the groups-to-roles relation so as to create a users-to-roles relation. As a result of this second joining procedure, the quadrapartite representation is temporarily transformed to a tripartite representation with users connected to roles, and roles connected to resources. Consider the quadrapartite relation illustrated in FIG. 5C. The lossless joining procedure of block 306 may be implemented, for example, by going through the users 102 one at a time. For each user 102, the groups 108 connected to the user may be examined to determine all the roles 106 which belongs to the user 102. The binary relation between users 102 and roles 106 may thus be formed. The result is re-formation of a tripartite representation 510, as illustrated in FIG. 5B.

Subsequently, in block 220, a second re-factoring procedure is applied to generate an updated set of "groups" between users and roles. This re-introduces two relations, where users are connected to one or more groups, and groups are connected to one or more roles. These two relations supersede or replace the previously introduced relation where users are connected to one or more roles. In accordance with an embodiment of the invention, the second re-factoring procedure 220 may be accomplished by the procedure shown in FIG. 2B which is described in detail above. The result is the re-formation of a quadrapartite representation 520, as illustrated in FIG. 5C. This re-formed quadrapartite representation typically differs from the previously-formed quadrapartite representation in that the group set has been re-generated and so should typically be more compact.

Per block 308, a determination may then be made as to whether the quadrapartite representation after the preceding iteration (of blocks 304, 240, 306, and 220) is smaller (i.e. simpler) than the previous quadrapartite representation. In other words, has the complexity of the representation been reduced by the latest iteration? If yes, then the procedure 300 may loop back to block 304 and perform another iteration. If not, then, the procedure 300 may stop and use (i.e. output) the previous quadrapartite representation per block 310.

In one embodiment, the complexity of the quadrapartite representation may be calculated as the total number of connections (edges) between users 102 and groups 108, plus the total number of connections between groups 108 and roles 106, plus the total number of connections between roles 106 and resources 104, plus the total number of groups 108, plus the total number of roles 106. In other words, the complexity or size of the representation may be calculated as the number of connections plus the number of groups and roles.

Figure 4A:
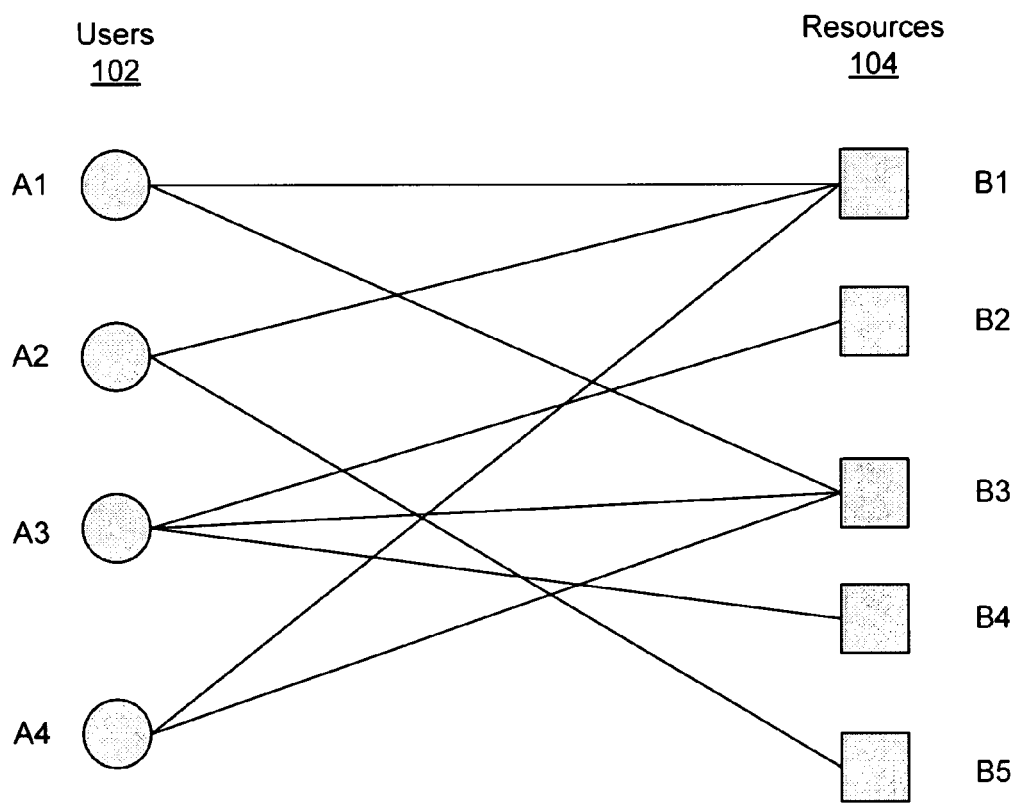
FIG. 4A is a diagram showing a bipartite relationship between users A1-A4 and resources B1-B5.
Figure 4B:
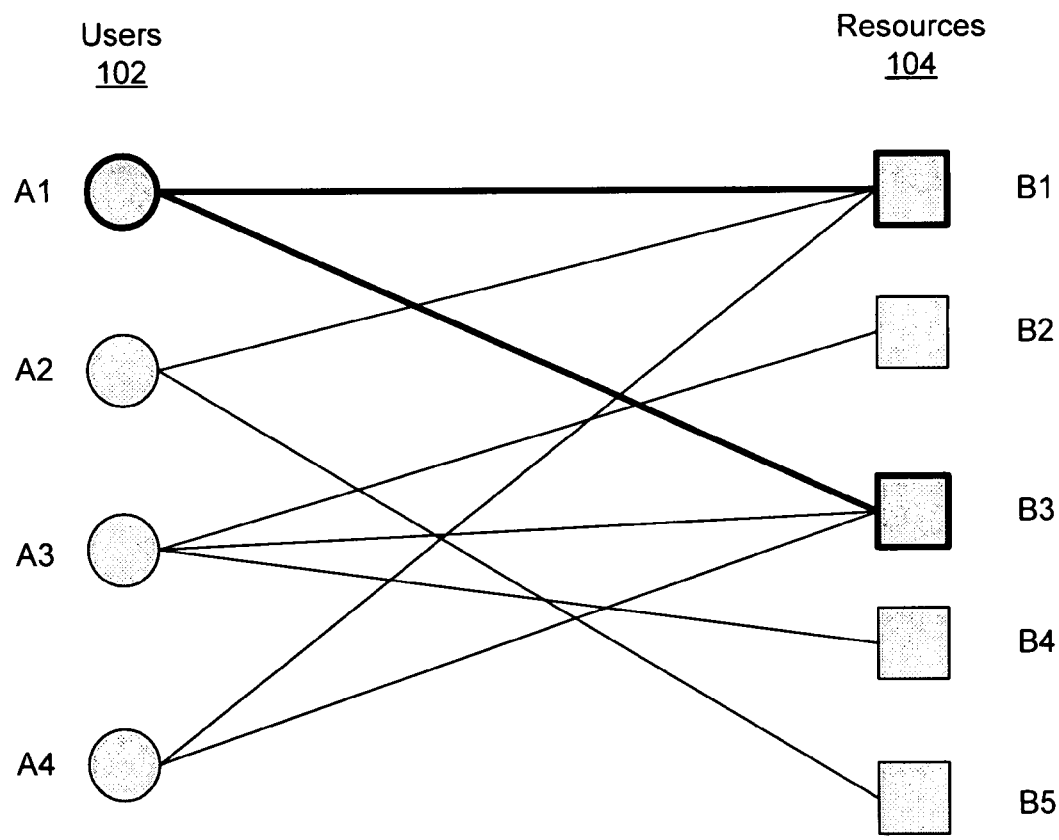
FIG. 4B is a diagram with emphasis on user A1 and its permissions.
Figure 4C:
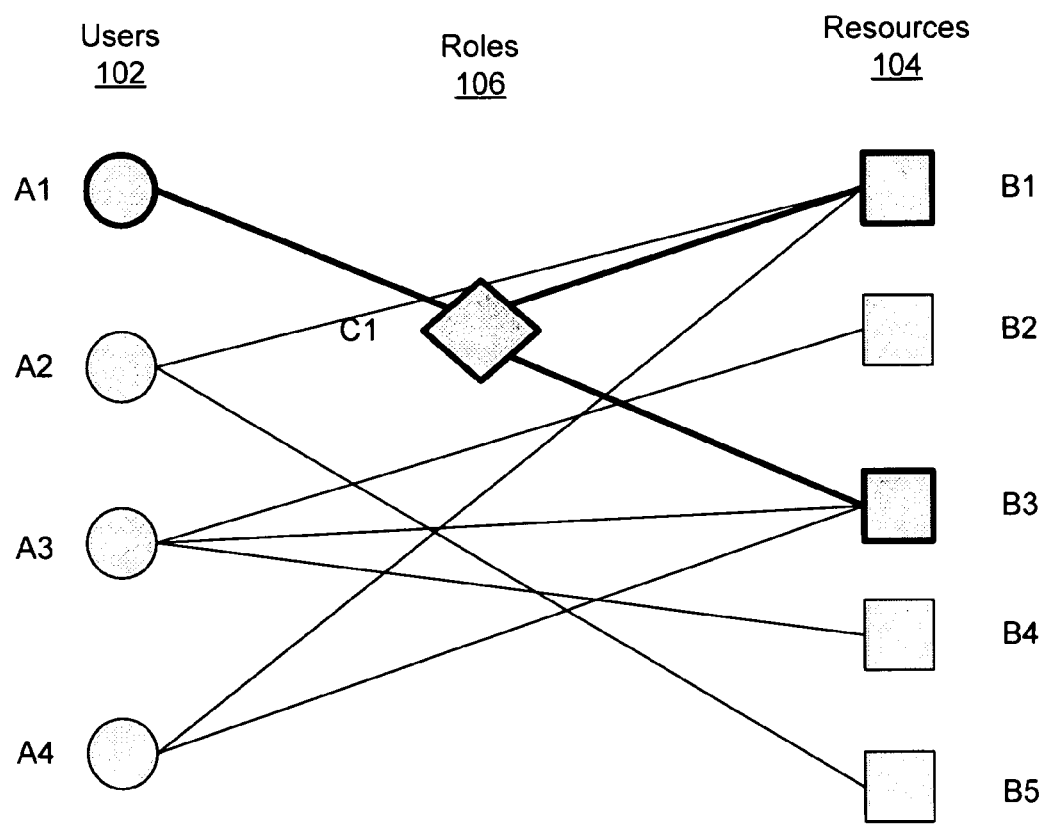
FIG. 4C is a diagram showing the introduction of role C1, and the assignment of role C1 to user A1.
Figure 4D:
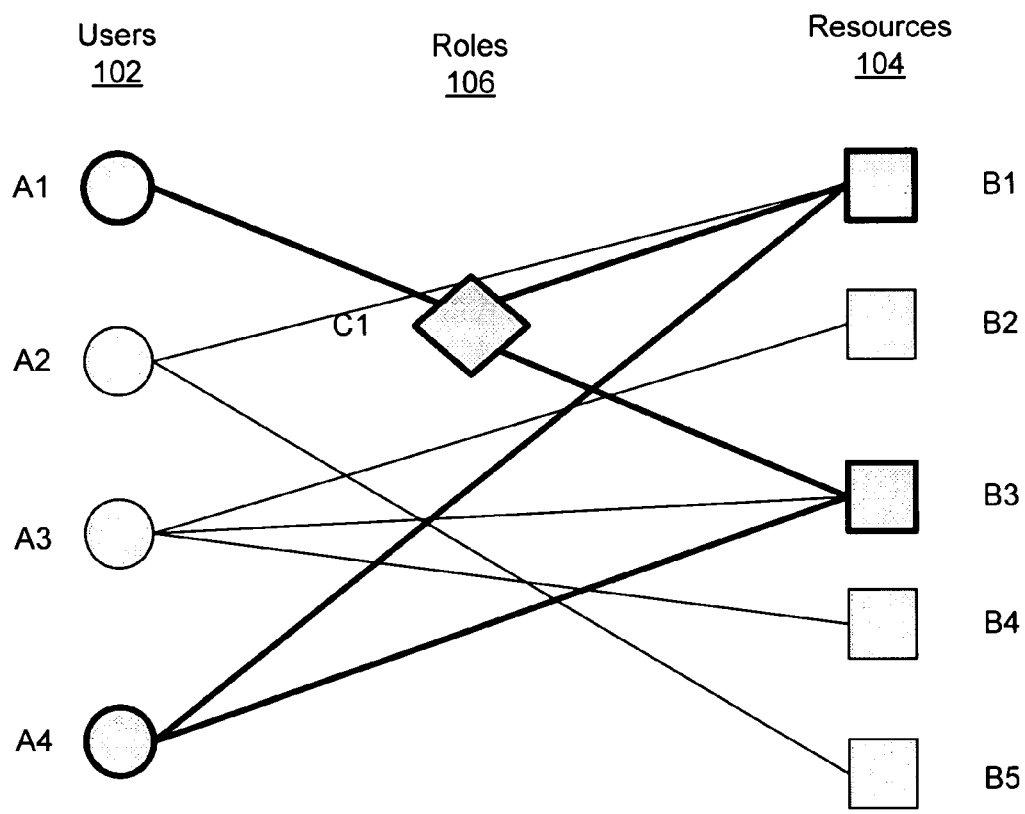
FIG. 4D is a diagram with emphasis on user A4 and its permissions.
Figure 4E:
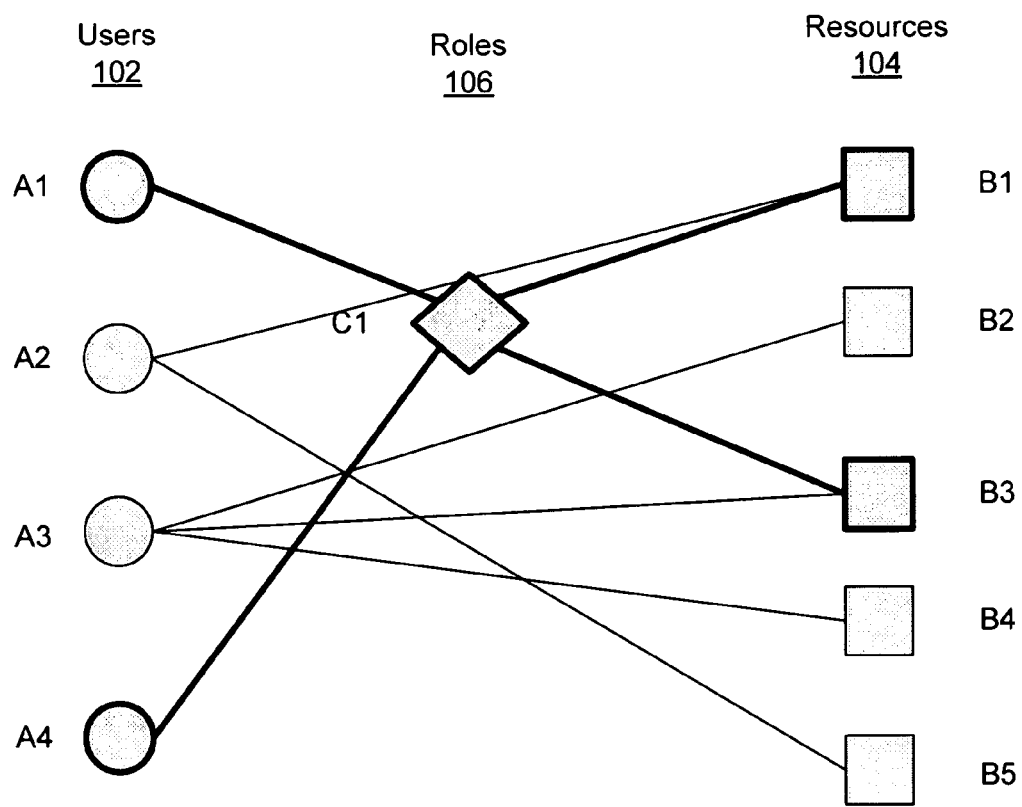
FIG. 4E is a diagram showing the assignment of role C1 to user A4.
Figure 4F:
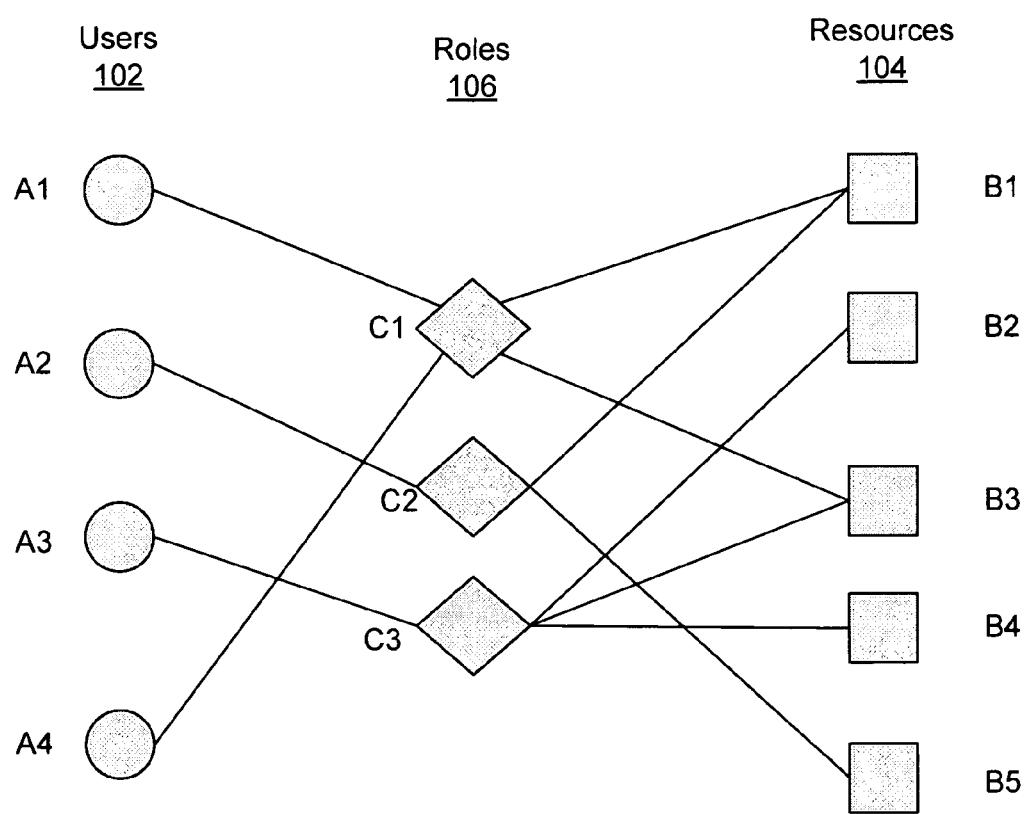
FIG. 4F is a diagram showing the assignment of roles C2 and C3 to users A2 and A3, respectively.

FIGS. 4A-4F are schematic diagrams depicting a simple example which is used for purposes of discussing embodiments of the present invention. More particularly, FIG. 4A is a diagram showing a bipartite relationship between users A1-A4 and resources B1-B5. FIG. 4B is a diagram with emphasis on user A1 and its permissions. FIG. 4C is a diagram showing the introduction of role C1, and the assignment of role C1 to user A1. FIG. 4D is a diagram with emphasis on user A4 and its permissions. FIG. 4E is a diagram showing the assignment of role C1 to user A4. FIG. 4F is a diagram showing the assignment of roles C2 and C3 to users A2 and A3, respectively.

FIG. 5A is a schematic diagram depicting elements for an example binary relation 500 involving users 102 and resources 104 in accordance with an embodiment of the invention. FIG. 5B is a schematic diagram depicting elements for an example tripartite (3-partite) representation 510 of a binary relation involving an intermediate layer of roles 106 in between users 102 and resources 104 in accordance with an embodiment of the invention. FIG. 5C is a schematic diagram depicting elements for an example quadrapartite (4-partite) representation 520 of a binary relation involving two intermediate layers of groups 108 and roles 106 in between users 102 and resources 104 in accordance with an embodiment of the invention. FIG. 5D is a schematic diagram depicting elements for an example tripartite (3-partite) representation 530 of a binary relation involving an intermediate layer of groups 108 in between users 102 and resources 104 in accordance with an embodiment of the invention.

Figure 6:
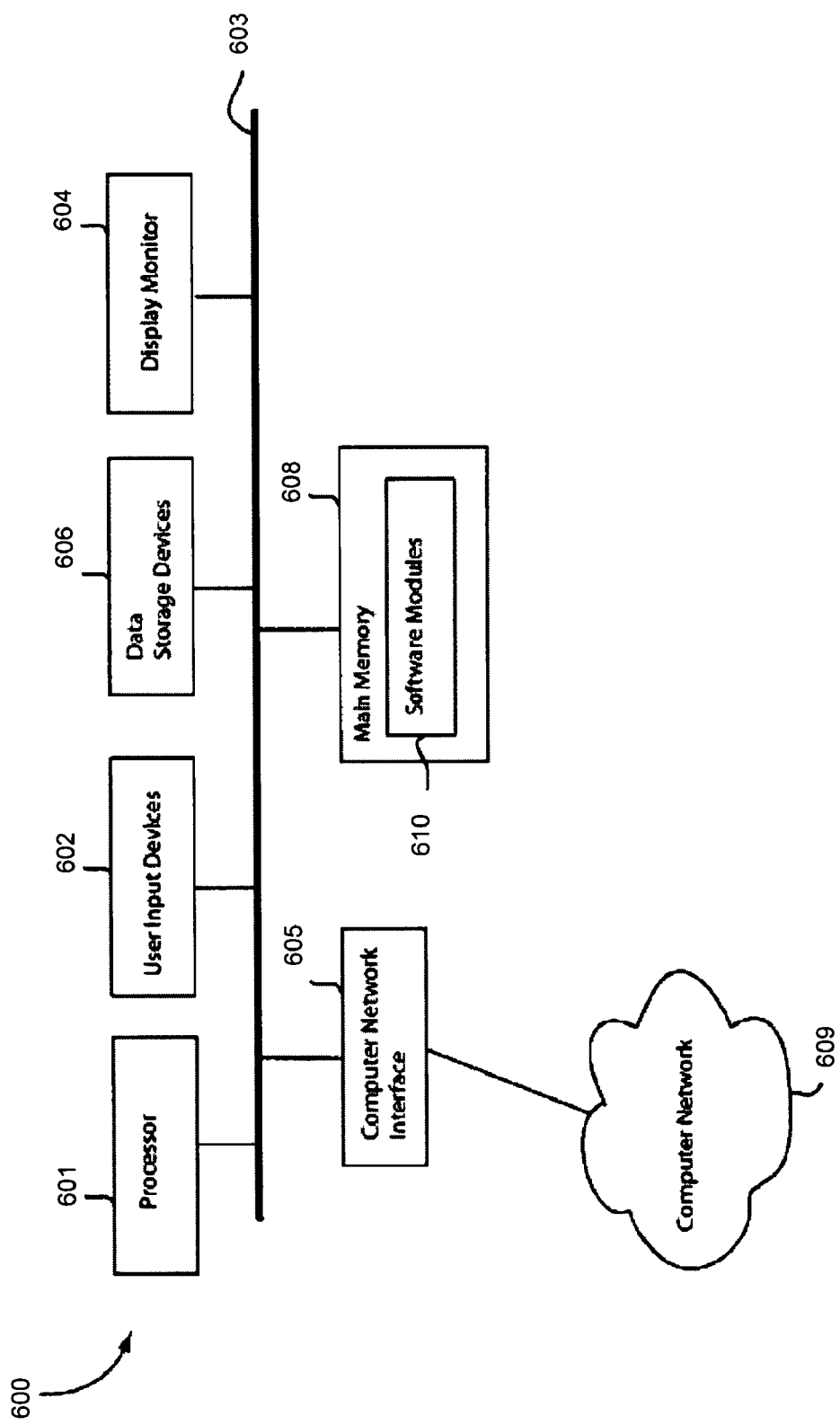
FIG. 6 is a schematic diagram of an example computer system which may be used to execute the computer-implemented procedures for role discovery in accordance with an embodiment of the invention.

FIG. 6 is a schematic diagram of an example computer system or apparatus 600 which may be used to execute the computer-implemented procedures for role discovery in accordance with an embodiment of the invention. The computer 600 may have less or more components than illustrated. The computer 600 may include a processor 601, such as those from the Intel Corporation or Advanced Micro Devices, for example. The computer 600 may have one or more buses 603 coupling its various components. The computer 600 may include one or more user input devices 602 (e.g., keyboard, mouse), one or more data storage devices 606 (e.g., hard drive, optical disk, USB memory), a display monitor 604 (e.g., LCD, flat panel monitor, CRT), a computer network interface 605 (e.g., network adapter, modem), and a main memory 608 (e.g., RAM).

In the example of FIG. 6, the main memory 608 includes software modules 610, which may be software components to perform the above-discussed computer-implemented procedures. The software modules 610 may be loaded from the data storage device 606 to the main memory 608 for execution by the processor 601. The computer network interface 605 may be coupled to a computer network 609, which in this example includes the Internet.

While the above-discussion focuses on an application of the disclosed techniques to an access control system, the disclosed techniques may also be applied to reduce complexity in the representation of binary relations in other databases and other contexts. In addition, while the above-discussion focuses on using the disclosed technique to compress a quadrapartite relation, variations of the disclosed technique may also be used to compress a 5-partite relation, a 6-partite relation, and so on.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method for compressing an n-partite representation of a binary relation where n is at least four, the method comprising:
   applying a first joining procedure to join first and second relations in the n-partite representation and so eliminate a first intermediate set of elements, resulting in a first (n−1)-partite representation; and
   applying a first re-factoring procedure to generate updated first and second relations and generate an updated first intermediate set of elements, resulting in an updated n-partite representation.

2. The computer-implemented method of claim 1, further comprising:
   applying a second joining procedure to join second and third relations in the updated n-partite representation and so eliminate a second intermediate set of elements, resulting in a second (n−1)-partite representation; and
   applying a second re-factoring procedure to generate updated second and third relations and generate an updated second intermediate set of elements, resulting in a further updated n-partite representation.

3. The computer-implemented method of claim 2, further comprising:
   determining whether a complexity of the further updated n-partite representation is lower than a complexity of the updated n-partite representation.

4. The computer-implemented method of claim 3, further comprising:
   repeating the joining and re-factoring procedures if the complexity of the further updated n-partite representation is lower than a complexity of the n-partite representation.

5. The computer-implemented method of claim 1, wherein n=4 such that the n-partite representation is a quadrapartite representation and the (n−1)-partite representations are tri-partite representations.

6. The computer-implemented method of claim 1, wherein the binary relation comprises a binary relation between user accounts and resources in an access control system.

7. The computer-implemented method of claim 1, wherein the binary relation comprises a binary relation between user accounts and resources in an access control system, and wherein n=4 such that the n-partite representation is a quadrapartite representation and the (n−1)-partite representations are tri-partite representations.

8. A computer-readable medium configured with computer-readable program code to compress a n-partite representation of an access control list, the computer-readable medium comprising:
   computer-readable program code configured to apply a first joining procedure to join first and second relations in the n-partite representation and so eliminate a first intermediate set of elements, resulting in a first (n−1)-partite representation; and computer-readable program code configured to apply a first re-factoring procedure to generate updated first and second relations and generate an updated first intermediate set of elements, resulting in an updated n-partite representation.

9. The computer-readable medium of claim 8, further comprising:

computer-readable program code configured to apply a second joining procedure to join second and third relations in the updated n-partite representation and so eliminate a second intermediate set of elements, resulting in a second (n−1)-partite representation; and computer-readable program code configured to apply a second re-factoring procedure to generate updated second and third relations and generate an updated second intermediate set of elements, resulting in a further updated n-partite representation.

10. The computer-readable medium of claim 9, further comprising:

computer-readable program code configured to determine whether a complexity of the further updated n-partite representation is lower than a complexity of the initial n-partite representation.

11. The computer-readable medium of claim 10, further comprising:

computer-readable program code configured to repeat the joining and re-factoring procedures if the complexity of the further updated n-partite representation is lower than a complexity of the updated n-partite representation.

12. The computer-readable medium of claim 8, wherein n=4 such that the n-partite representation is a quadrapartite representation and the (n−1)-partite representations are tripartite representations.

13. The computer-readable medium of claim 8, wherein the binary relation comprises a binary relation between user accounts and resources in an access control system.

14. The computer-readable medium of claim 8, wherein the binary relation comprises a binary relation between user accounts and resources in an access control system, and wherein n=4 such that the n-partite representation is a quadrapartite representation and the (n−1)-partite representations are tri-partite representations.

15. An automated method for compressing a 4-partite representation of an access control list, the method comprising:

applying a first joining procedure to join first and second relations in the 4-partite representation and so eliminate a first intermediate set of elements, resulting in a first 3-partite representation;

applying a first re-factoring procedure to generate updated first and second relations and an updated first intermediate set of elements, resulting in an updated 4-partite representation;

applying a second joining procedure to join second and third relations in the 4-partite representation and so eliminate a second intermediate set of elements, resulting in a second 3-partite representation; and applying a second re-factoring procedure to generate updated second and third relations and an updated second intermediate set of elements, resulting in a further updated 4-partite representation; and determining whether a complexity of the further updated 4-partite representation is lower than a complexity of 4-partite representation and/or the updated 4-partite representation.

16. The method of claim 15, further comprising repeating steps of said method until a determination is made that the complexity of the further updated 4-partite representation is not lower than the complexity of the 4-partite representation and/or the updated 4-partite representation.

17. The method of claim 15, wherein the first relation is a relation between users and groups, the second relation is between groups and roles, and the third relation is between roles and resources.

* * * * *

UNITED STATES PATENT AND TRADEMARK OFFICE
CERTIFICATE OF CORRECTION

| | | |
|---|---|---|
| PATENT NO. | : 7,904,476 B1 | Page 1 of 1 |
| APPLICATION NO. | : 11/888001 | |
| DATED | : March 8, 2011 | |
| INVENTOR(S) | : Robert Samuel Schreiber | |

It is certified that error appears in the above-identified patent and that said Letters Patent is hereby corrected as shown below:

On the Title page, in Item (73), Assignee, in column 1, line 1, delete "Develpment" and insert -- Development --, therefor.

In column 9, line 25, in Claim 10, after "the" delete "initial".

Signed and Sealed this

Nineteenth Day of July, 2011

David J. Kappos
*Director of the United States Patent and Trademark Office*